Jan. 3, 1961 J. H. TINDALL 2,967,228
WELDING DIE
Filed Oct. 20, 1958
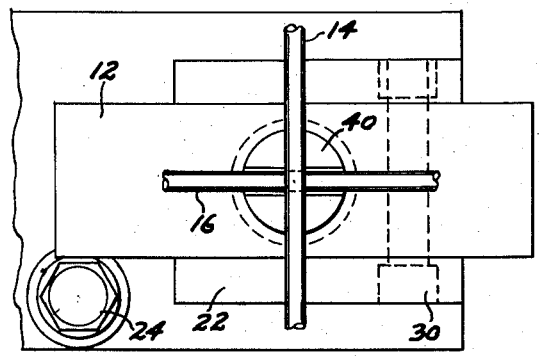
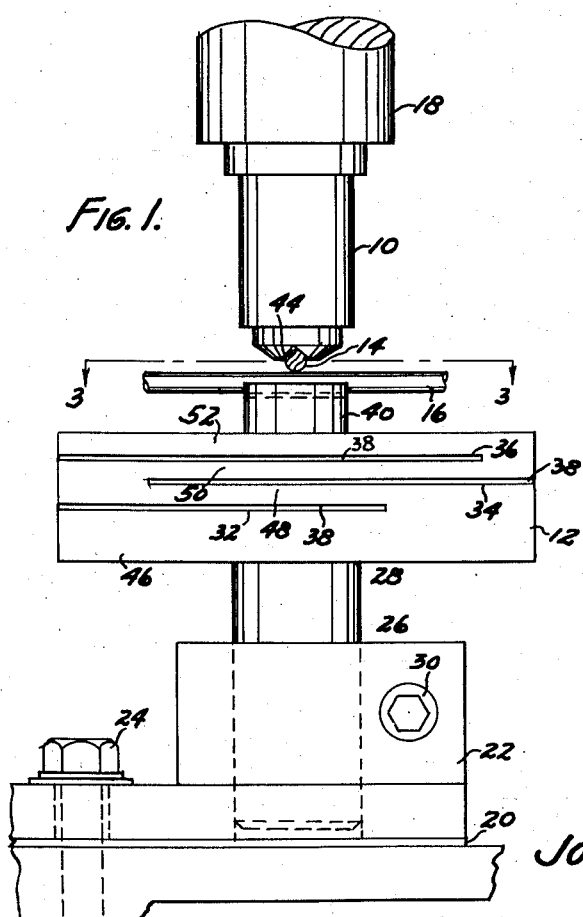
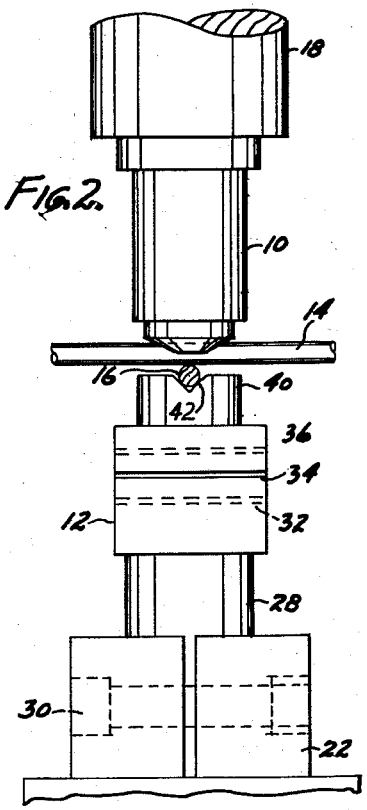
INVENTOR.
JOSEPH H. TINDALL
BY

United States Patent Office 2,967,228
Patented Jan. 3, 1961

2,967,228

WELDING DIE

Joseph H. Tindall, Pontiac, Mich., assignor to Progressive Welder Sales Company, Pontiac, Mich., a corporation of Michigan Filed Oct. 20, 1958, Ser. No. 768,482

7 Claims. (Cl. 219—119)

This invention relates to a welding die.

Many materials, aluminum, for example, when welded by means of opposed electrodes in pressure contact with the material, require an instantaneous follow-up in order to produce a sound weld. Heretofore, various follow-up devices have been proposed in the nature of springs, fluid pressure, etc.; and for the most part, such follow-up arrangements have been incorporated in the movable electrode of the welding machine. While the follow-up arrangements heretofore utilized are satisfactory for some purposes, they have not, for the most part, been satisfactory in welding some materials, aluminum cross wires, for example, because they do not respond sufficiently quickly.

It is an object of this invention to provide a welding die having an instantaneous, low inertia follow-up arrangement integral therewith.

More specifically, the invention contemplates a welding die which is designed such that the follow-up is produced by the electrical field of induction generated by the current passing through the die.

In the drawings:

Fig. 1 is a fragmentary front elevational view of a welding machine equipped with the welding die of the present invention.

Fig. 2 is a fragmentary side elevational view of the machine illustrated in Fig. 1.

Fig. 3 is a sectional view taken along the lines 3—3 in Fig. 1.

The welding machine illustrated in Fig. 1 includes an upper electrode or die 10 and a lower electrode or die 12. The operation illustrated is one of welding a pair of crossed aluminum wires 14, 16. With the exception of the lower die 12, the machine illustrated may be of any of the conventional types; and thus, the upper electrode 10 may be mounted at the lower end of a piston rod 18 that is actuated in any suitable fashion to exert a downward welding pressure on the two crossed wires 14 and 16 that are arranged between the electrode 10 and the die 12.

It will be appreciated that current is caused to flow between the members 10 and 12 when welding pressure is applied to the wires 14 and 16. The current conductor connected with the die 12 may comprise a bus bar 20 on the bed of the welding machine that is clamped in electrical contact with the die support 22 by means of a bolt 24. Die support 22 is fashioned with a cylindrical socket 26 adapted to receive the shank 28 of the lower die 12. Die support 22 is preferably of the slotted type which enables the shank 28 to be firmly clamped in the socket 26 by a screw 30.

The general arrangement just described is more or less conventional, and the invention here relates specifically to the construction of die 12. As is clearly illustrated in the drawings, the die 12 comprises a rectangular block of copper that is provided with a series of machined slots 32, 34 and 36, the successive slots extending inwardly from opposite ends of the die block. These slots are filled with pads 38 of die rubber. The upper face of die block 12 is provided with a shoe 40 fashioned with a groove 42 in which the wire 16 is arranged to be seated. The lower end of electrode 10 is provided with a groove 44 disposed perpendicularly to the groove 42 and in which the wire 14 is arranged to be seated.

It will be noted that the slots 32, 34, 36 divide the die 12 into four serially connected laminations or legs 46, 48, 50 and 52. With this construction, the current passing through die 12 is caused to travel a zig-zag course through the legs 46, 48, 50 and 52. As the current travels this zig-zag course, the current in each lamination or leg travels in a direction opposite to its direction of travel in the next adjacent lamination or leg. The electrical fields induced in each leg therefore oppose one another with a force that is in direct proportion with the intensity of the current travelling through the die. The electrical fields induced in each leg of the die tend to move the legs 46, 48, 50 and 52 apart in the well-known manner. Thus, as soon as the welding cycle is initiated, an upward force against the wires being welded is exerted; and as soon as the metal in the wire begins to melt, an instantaneous and low inertia follow-up is provided.

The slots are preferably dimensioned in accordance with the proportions illustrated in Fig. 1. Each of these slots extends well beyond the center portion of the die block 12. Preferably, the upper slot 36 is longer than the center slot 34 and the center slot 34 is longer than the lower slot 32. The legs 48, 50 and 52 are generally of equal thickness; and the lower leg 46 is thicker than the other legs. This particular design provides a die block which is sufficiently strong to withstand the required welding pressure; and at the same time, the legs are sufficiently free of one another so as to produce the instantaneous follow-up required at the moment the metal being welded begins to melt.

While reference has been made herein to the welding of aluminum cross wires, it will be appreciated that the welding die of this invention is not limited to any particular welding operation nor to the welding of any particular metal. In any welding operation where a fast, low inertia follow-up is required, the welding die disclosed herein may be employed.

I claim:

1. A welding die comprising a block formed of an electrically conductive material, said block being divided into a plurality of superposed laminations, the laminations being serially connected at opposite ends with the adjacent laminations and with the adjacent laminations being spaced from each other along the portions thereof extending from the serially connected ends thereof, whereby when current is caused to pass through said die, the current travels a zig-zag path through the series of laminations and the electrical fields induced thereby in each of said laminations oppose the electrical fields in the adjacent laminations whereby to urge said laminations apart.

2. A welding die comprising a block of electrically conductive material, said block having a plurality of slots therein extending part way through the block, the successive slots overlapping one another and originating alternately from opposite ends of the block.

3. A welding die comprising a block of electrically conductive material, said block having a plurality of parallel slots formed therein, the successive slots originating alternately from opposite ends of the block and dividing the block into a plurality of legs, the adjacent legs being connected together at one end and being spaced apart throughout a major portion of their length.

4. A welding die comprising a block of electrically conductive material having a length substantially greater than the thickness thereof, said block having top and bottom faces, said block between said top and bottom faces having a plurality of parallel, generally horizontally extending slots therein, the successive slots originating alternately from opposite ends of the block and extending through the block substantially beyond the central portion thereof, said slots dividing said block into a plurality of successive legs which define a zig-zag path of travel for the current passing through said block in a direction between said top and bottom faces.

5. A welding die as called for in claim 4 wherein said legs are relatively thin as compared with the thickness of said block.

6. A welding die as called for in claim 4 wherein said slots are of progressively increasing length in an upward direction.

7. A welding die as called for in claim 4 wherein the effective free length of said legs progressively increases in an upward direction.

References Cited in the file of this patent

UNITED STATES PATENTS

| | | |
|---|---|---|
| 2,049,312 | Palmer | July 28, 1936 |
| 2,382,711 | Hagedorn | Aug. 14, 1945 |
| 2,386,261 | Redmond | Oct. 9, 1945 |
| 2,469,897 | Schilling et al. | May 10, 1949 |
| 2,863,986 | Mechlenborg | Dec. 9, 1958 |